H. F. DUNN.
CHEESE CUTTER.
APPLICATION FILED FEB. 23, 1905.
1,052,904.
Patented Feb. 11, 1913.
3 SHEETS—SHEET 1.
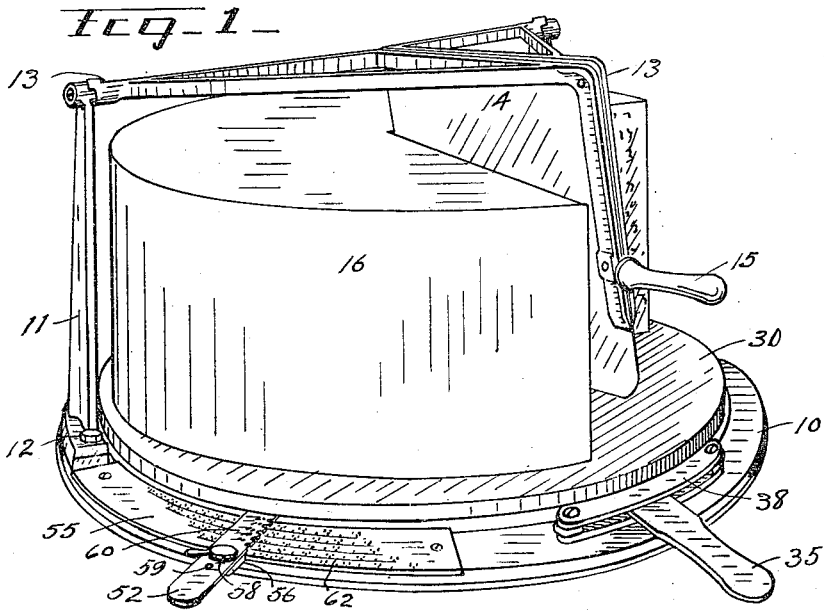
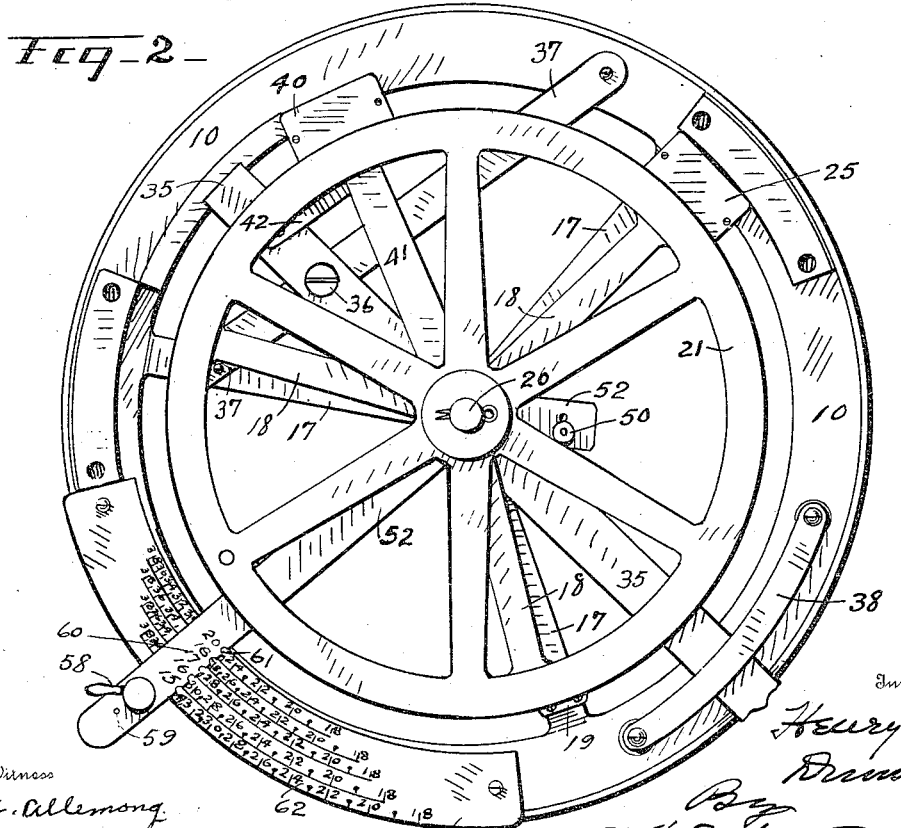

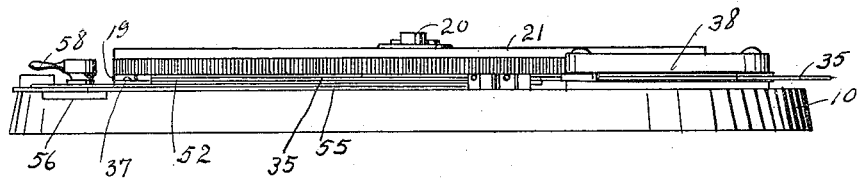
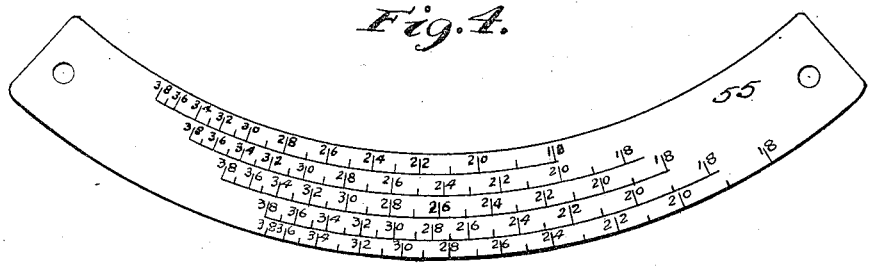
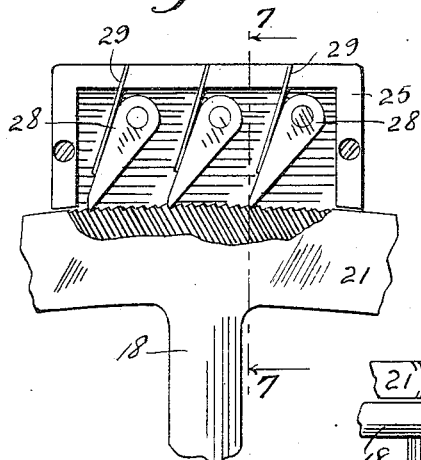
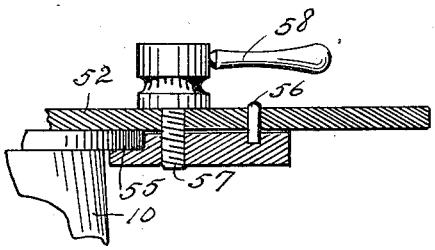
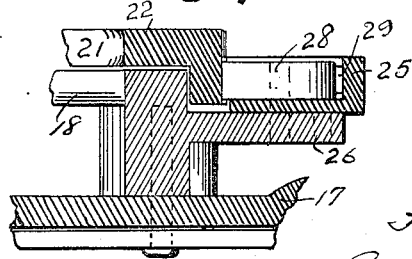

H. F. DUNN.
CHEESE CUTTER.
APPLICATION FILED FEB. 23, 1905.
1,052,904.
Patented Feb. 11, 1913.
3 SHEETS—SHEET 3.
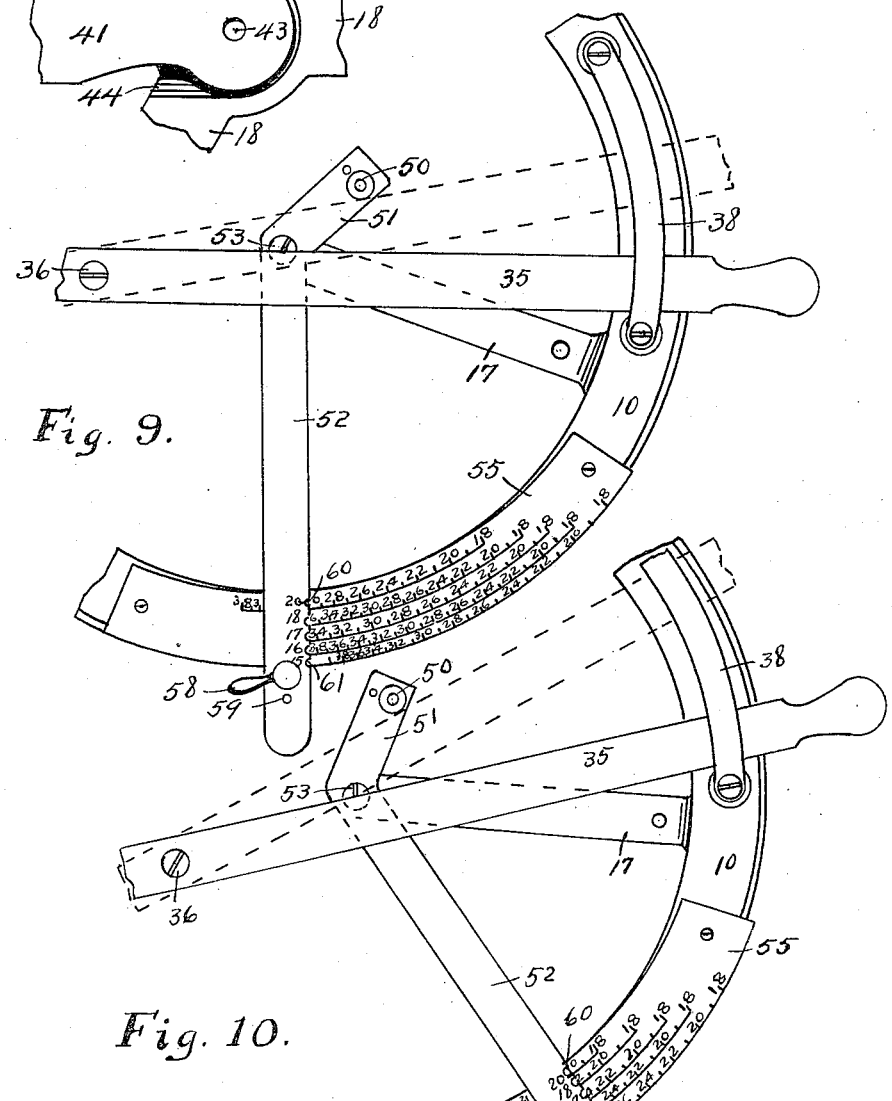

UNITED STATES PATENT OFFICE.

HENRY F. DUNN, OF ANDERSON, INDIANA, ASSIGNOR OF ONE-HALF TO THE COMPUTING SCALE COMPANY, OF DAYTON, OHIO, A CORPORATION OF OHIO, AND ONE-HALF TO DUNN MANUFACTURING COMPANY, OF ANDERSON, INDIANA, A CORPORATION OF INDIANA.

CHEESE-CUTTER.

1,052,904. Specification of Letters Patent. Patented Feb. 11, 1913.

Application filed February 23, 1905. Serial No. 246,997.

*To all whom it may concern:*

Be it known that I, HENRY F. DUNN, of Anderson, county of Madison, and State of Indiana, have invented a certain new and useful Cheese-Cutter; and I do hereby declare that the following is a full, clear, and exact description thereof, reference being had to the accompanying drawings, in which like letters refer to like parts.

The object of this invention is to provide price indicating cheese cutters and various other improvements in computing cheese cutters.

One feature of the invention consists in the idea of providing computing cheese cutters with a scale for setting such device to cut portions of a certain unit of value, such as five-cent slices, from cheeses of varying weights and prices.

Another feature of the invention consists in providing such device with an adjustable stop for limiting the operation thereof, so that it will cut portions of a certain unit of value, and in providing a scale for determining the position of said stop to accomplish said result.

Another feature of the invention consists in providing a price per pound scale and a scale of weights of cheeses located adjacent each other and coöperating to control the action of the device, and in providing a plurality of scales adjacent each other that coöperate in setting the device to cut portions of a certain unit of value; and especially in utilizing the price per pound scale and the scale of weights of cheeses together for limiting the throw of the lever or other means for feeding the knife to the cheese or the cheese to the knife.

These and the various other features of the invention will be understood from the accompanying drawings and the following description and claims.

In the drawings Figure 1 is a perspective view of a cheese cutter, showing a cheese in place and partly cut, and the knife partially elevated. Fig. 2 is a plan view of the device with the cheese, cheese board and knife mounting mechanism removed, and part of the actuating lever broken away. Fig. 3 is a side elevation of what is shown in Fig. 2. Fig. 4 is a plan view of the scale of weights of cheeses enlarged. Fig. 5 is a plan view of the ratchet box with the top removed and also a portion of the cheese-supporting frame, it being partially broken away. Fig. 6 is a vertical longitudinal section through the outer end of the setting lever and the adjacent part of the frames, showing means for clamping said lever in place. Fig. 7 is a section through the ratchet box and adjacent parts on the line 7—7 of Fig. 5. Fig. 8 is a bottom view of the center of the upper spider and the inner end of the ratchet box lever pivoted thereto. Figs. 9 and 10 are plan views of a portion of the device with the cheese-supporting frame removed, showing the setting lever adjusted to different places on the scale so as to modify the throw of the actuating lever to obtain portions of a certain unit of value, the limit of movement of the actuating lever being indicated by dotted lines.

The cheese cutter herein shown merely for illustrating the general nature of my invention has a base frame 10 upon which a pair of standards 11 are removably secured by bolts 12, and the knife frames 13 are pivotally mounted on the upper ends of said standards 11 and between them the knife 14 is secured. A handle 15 is provided for operating said knife frame and knife vertically to cut the cheese 16 into slices radiating from the center thereof.

The frame 10 has an integral spider frame of three bars 17. A removable spider 18 is mounted above said integral or stationary spider. It is formed of three bars radiating from the center and having at the outer end thereof downwardly extending heads 19 that are bolted to the integral spider below. This elevates the removable spider somewhat away from the spider of the base so as to leave a space between them for the cheese-feeding mechanism hereafter to be described.

The upper or removable spider 18 has a pin 20 extending from its center upward on which the cheese-carrying frame 21 is rotatably mounted. This cheese-carrying frame has a downwardly extending flanged rim 22, and the periphery of said rim or of the lower part or half of the rim of said cheese-carrying frame, is notched or serrated for rotating the same by means hereafter explained. It is held from backward rotation by the clutch or ratchet box 25 mounted on a plate 26 extending outwardly from the head of one of the arms of said upper or removable spider. Said clutch or ratchet box is spaced away from the head of said spider so that the lower flange 22 of the cheese-carrying frame will fit snugly in between them. Said clutch consists of a ratchet box with three pawls or ratchets 28 actuated by springs 29.

A cheese-board 30 is mounted upon said cheese-carrying frame 20 so as to rotate therewith. Means is provided for gradually and slowly rotating said cheese-board with the cheese thereon in order to feed the same to the knife.

The chief features of this invention relate to the means for feeding the cheese to the knife and for adjusting said feeding means so that the same will automatically move the right distance to enable one to sever cheeses of varying weights into portions of a certain unit of value, such as five cents.

In the first place, the actuating lever 35 is fulcrumed on a fixed pin 36 secured in the bar 37 that is fastened on the base of the machine, as shown. This lever may be otherwise fulcrumed, and its actuating end extends under an arc bar 38 on the base of the machine, and has a handle at the outer end thereof. Any means may be employed in connection with this lever to enable it to rotate the cheese-carrying frame 21 a certain distance at each operation of the lever. What I show herein consists of a single acting clutch in the nature of a ratchet box 40 secured on the outer end of the lever 41 that is pivotally mounted by a screw 43 to the under side of the center of the upper spider 18, and for this purpose the inner end of said lever 41 is mounted and fits in a recess or socket 44 in the spider, as shown in Fig. 8. This recess is merely for the purpose of diminishing the space between the two spiders. A bar 42 is pivoted to the outer portion of said lever 41 and also to the main lever 35. This arrangement gives the ratchet box lever ample room for movement as far as it can be moved by the main lever 35. The clutch or ratchet box 40 is made like the ratchet box 25 and engages the notches or teeth on the periphery of the cheese-carrying frame.

In order to cut slices of a certain unit of value, means is provided to limit the throw of the lever 35. This is effected by the stop 50 on the inner bent end 51 of the setting lever 52 that is pivotally mounted at its bend to the center of the stationary spider on the base by means of a bolt 53. The main part of said lever is straight and extends radially beyond and rests upon the base. Upon the base under said lever a scale plate 55 is secured, arcuate in form and concentric with the center of the base and protruding slightly beyond the base, as seen in Fig. 6. Said lever 52 is clamped in position on said scale plate by a clamping plate 56 that has a jaw for engaging the under side of said scale plate, and is tightened by a screw 57 actuated by a little lever 58. The outer end of the clamping plate 56 is held in position by a pin 59 extending into a hole in the lever 52. By giving the handle 58 a quarter turn or the like, the lever 52 can be clamped or released from its position.

Upon the lever 52 there is a scale 60 indicating various prices per pound of cheeses of different value, the scales here indicating prices from fifteen cents to twenty cents per pound. Opposite each price per pound numeral there is a notch 61 in the right-hand edge of said setting bar 52. Corresponding with each of said notches and with each price per pound numeral on the lever 52, there is a scale 62 on the scale plate 55 indicating the total weights of various cheeses. This scale is curved parallel with the plate on which it is located, and it is concentric with the circular base. Each of these scales have numerals representing the weights of cheeses from eighteen pounds to thirty-eight pounds, as seen best in Fig. 4.

In the price per pound scale on the lever 52 the highest numeral is toward the center of the cheese cutter, and in the scales indicating the weights of various cheeses, the scale registering with the higher price per pound is not only correspondingly nearer the center of the cheese cutter but also extends correspondingly farther to the left. And the graduations for these different weight scales vary gradually from each other, as shown.

The foregoing feature of the invention will be understood from the following description of the operation.

If a cheese weighing thirty pounds is placed on the machine, and it is desired to sell the same in five-cent portions at the rate of twenty cents per pound, the setting lever 52 is moved so that the numeral 20 on it will register with the numeral 30 on the weight scale below, as seen in Fig. 9. Then the stop 50 will be in position to limit the throw of the lever 35 so that it will feed the cheese toward the knife far enough at each throw to cause the knife to cut a five-cent slice every time. After the machine has been thus set, all that is done is to move the lever 35 to its limit of movement for a five-cent slice and then operate the knife. For a ten-cent slice the lever is given two throws and then the knife is operated. If, however, the cheese to be cut weighs only twenty pounds, and its selling price is twenty cents per pound, the setting lever is put in the position shown in Fig. 10, so that the numeral 20 thereon will register with the numeral 20 on the weight scale below. This will give the actuating lever a correspondingly greater throw so as to cut thicker slices but slices that would still have the same amount of cheese. In the same way the machine is adjusted for various prices. If it be desired to sell a twenty-four pound cheese at sixteen cents per pound, the lever 52 is moved a little farther to the right than it is in Fig. 10, so that the numeral 16 on the lever 52 will register with the numeral 24 on the scale below, and then said lever is clamped in position.

I do not wish to be limited to any particular numerals on these scales. I have shown a plurality of weight scales and a plurality of prices on the price scale, but these may be varied to suit the manufacturer, that herein shown, however, being suitable for cheeses and prices as a general rule.

I have devised different forms or apparatus besides the above embodying the principles of my invention, and hence, I do not wish to be limited to the details of construction shown herein for the purpose of illustrating the nature of the invention, for my invention contemplates its being embodied in any form of apparatus operating upon the principles indicated herein and underlying said invention however widely such forms of apparatus may differ in construction and details. Thus I do not wish to be limited to the exact character of the means shown for setting the device so that it will cut portions of uniform value from cheeses of various weights, or at various prices whether such setting means be in the form of the lever and stop shown or otherwise, so long as the scale for determining the position of said setting means is adjacent the setting means. Nor do I wish to be limited to the precise means shown for the intermittent rotary movement of the cheese-support, nor to the particular form of clutch or ratchet, nor to the particular point at which the actuating lever is fulcrumed, as these details may be modified without avoiding the spirit of the invention.

What I claim as my invention and desire to secure by Letters Patent is:

1. In a device for cutting cheese and the like into portions, a knife, a rotary cheese-support, a hand lever permanently fulcrumed away from the center of the cheese-support, means actuated by said lever for moving said cheese-support to a less extent than the movement of the handle portion of said lever, an adjustable stop for limiting the movement of said lever, and a combined money-weight scale for use in determining the proper position of said stop.

2. In a device for cutting cheese and the like into portions, a single means for setting said device to cut portions of a certain unit of value at every full operation thereof, and a plurality of scales adjacent said setting means that coöperate in indicating the proper position of said setting means.

3. In a device for cutting cheese and the like into portions, a single means for setting said device to cut portions of a certain unit of value at every full operation thereof, a price per-pound scale, and a scale of weights of cheeses adjacent said setting means, said scales coöperating to indicate the proper position of said setting means.

4. In a device for cutting cheese and the like into portions, means for setting said device to cut portions of a certain unit of value at every full operation thereof, and a price-per-pound scale and a scale of weights of cheeses, one of said scales movable with said setting means and both scales coöperating in indicating the proper position of said setting means.

5. In a device for cutting cheese and the like into portions, a knife, a cheese-support, means for moving the cheese-support to bring the cheese to the knife as desired, a lever for setting a limit to the operation of said actuating means, and a scale along which said lever moves for indicating the proper position thereof.

6. In a device for cutting cheese and the like into portions, a knife, a cheese-support, means for moving the cheese-support to bring the cheese to the knife as desired, a lever for setting a limit to the operation of said actuating means, and a combined money weight scale along which said setting lever moves for indicating the proper position of said lever.

7. In a device for cutting cheese and the like into portions, a lever for setting the device to cut portions of a certain unit of value from cheeses of different weights and at different prices per pound, and a plurality of scales for indicating the proper position of said lever.

8. In a device for cutting cheese and the like into portions, a lever for setting the device to cut portions of a certain unit of value from cheeses of different weights and at different prices-per-pound, and a price-per-pound scale and a scale of weights of cheeses adjacent said lever for use in indicating the proper position of said lever.

9. In a device for cutting cheese and the like into portions, a base, a lever for setting the device to cut portions of a certain unit of value that extends outward beyond the base and is movable over the base, and a scale on the base across the path of the lever for indicating the proper position of the lever, there being one scale for each price per pound of the cheese.

10. In a device for cutting cheese and the like into portions, a base, a lever for setting the device to cut portions of a certain unit of value that extends outward beyond the base and is movable over the base, scales indicating the weights of various cheeses secured on said base across the path of said lever, and a price per-pound scale on said lever that coöperates with said weight scales for indicating the proper position of said lever.

11. In a device for cutting cheese and the like into portions, means for setting the device to cut portions of a certain unit of value from cheeses of varying weights or values, and a plurality of scales for indicating the proper position of said means, one of said scales being stationary and the other movable.

12. In a device for cutting cheese and the like into portions, a knife, a rotary cheese-support, a lever for actuating the same that extends under the cheese-support, and a scale-adjusted setting lever fulcrumed under the cheese-support with a stop thereon for limiting the movement of said actuating lever.

13. In a device for cutting cheese and the like into portions, a knife, a rotary cheese-support, a lever for actuating the same that extends under the cheese-support, a scale adjusted setting lever fulcrumed under the cheese-support with a stop thereon for limiting the movement of said actuating lever, and means for clamping said setting lever in position.

14. In a device for cutting cheese and the like into portions, a price per pound scale, and a plurality of scales indicating the weights of cheeses, there being one of said weight indicating scales for each price per pound, the weight scales being placed adjacent the relative price per pound on the price-per-pound scale so that said scales coöperating will indicate the position in which to set the parts of the device so as to cut portions of a certain unit of value in cheeses of varying weights and of varying prices.

15. In a device for cutting cheese and the like into portions, a movable cheese-support, a reciprocable lever for actuating said cheese-support, a stop for limiting the throw of said lever, a bar carrying said stop fulcrumed at the axis of said cheese support, and means for holding said bar in any desired position.

16. In a device for cutting cheese and the like into portions, a movable cheese-support, a reciprocable lever for actuating said cheese support, a stop for limiting the throw of said lever, a bar carrying said stop fulcrumed at the axis of said cheese support said bar having on its outer end a price-per-pound scale, a scale indicating the weights of cheeses arranged concentric of the axis of said cheese-support and beneath the portion of said bar containing the price per-pound-scale, and means for holding said bar in any position in which it may be set.

17. In a device for cutting cheese and the like into portions, a movable cheese-support, a reciprocable lever for actuating said cheese-support, a stop for limiting the throw of said lever, a bar carrying said stop fulcrumed at the axis of said cheese support, said bar having on its outer end a price-per-pound scale, a plurality of scales indicating the weights of cheeses, there being one of such scales for each numeral on the price-per-pound scale and arranged in graduated positions, and means for holding said bar in any desired position.

18. In a device for cutting cheese and the like into portions, a knife, a rotary cheese-support, a lever for moving the cheese-support, and means for setting the device to cut portions of a certain unit of value from cheeses of different weights and at different prices-per-pound, said means including scales indicating different weights and prices per pound for determining the extent of movement of said lever.

19. In a cheese cutter, the combination of a cheese cutting device with means for moving the cheese so as to bring sections of said cheese in position to be cut therefrom, means for determining such movement of the cheese comprising an adjustable stop against which the cheese actuating means is advanced, and a setting device comprising a scale having weight and value graduations thereon to fix the position of such stop.

20. In a cheese cutter, the combination of a cheese cutting device with means for moving the cheese so as to bring sections of said cheese in position to be cut therefrom, means for determining such movement of the cheese comprising an adjustable stop against which the cheese actuating means is advanced, and a setting device comprising a scale and a part movable along said scale and adapted to adjust the position of said stop.

21. In a cheese cutter, the combination of a cheese cutting device with means for moving the cheese so as to bring sections of said cheese in position to be cut therefrom, means for determining such movement of the cheese comprising an adjustable stop against which the cheese actuating means is advanced, and a setting device comprising a total weight scale and a part movable along said scale and adapted to adjust the position of said stop.

22. In a device for cutting cheese into portions of predetermined values, the combination with a knife, a cheese-carrying table, and an actuating-lever, of a stop, a setting-lever carrying said stop, said setting lever pivoted to swing in a horizontal plane, and means whereby said setting-lever is positively adjusted to set said stop.

23. In a device for cutting cheese into portions of predetermined values, the combination with a knife, a cheese-carrying table, and an actuating lever, of a stop, a setting-lever carrying said stop, and a setting means whereby said setting-lever is adjusted to set said stop.

24. In a computing cheese-cutter, the combination of a base and a rotary table mounted thereon, an arm pivoted to the base concentrically with the table and carrying at its free end means adapted to engage and actuate the table, a lever pivoted to the base under the table and having its free end projecting beyond the edge of the table, means pivotally connecting the lever at a point to one side of its fulcrum to the arm, and scale means on the base beyond the table for controlling the movements of the lever.

25. In a computing cheese-cutter, the combination of a base and a rotary table mounted thereon, an arm pivoted to the base concentrically with the table and carrying at its free end means adapted to engage and actuate the table, a lever pivotally mounted on the base and carrying means movably connecting it to said arm, said means lying under the arm at the point of engagement therewith, and scale means on the base for controlling the movements of said lever.

26. In a computing cheese-cutter, the combination of a base and a rotary table mounted thereon, an arm pivoted to the base concentrically with the table and carrying means adapted to engage and actuate the table, a lever pivoted to the base at a point between the center and periphery of the base, means movably connecting said lever to said arm, and scale means for controlling the movement of said lever.

27. In a computing cheese cutter, the combination of a base, a rotary cheese table, means for rotating and controlling the rotary movements of said table to measure off pieces of cheese of a predetermined money value, said means consisting of a lever working horizontally under the table, devices connecting said lever to the table, stops between which the lever vibrates, one of said stops being adjustable, a price scale, and a total weight scale, one of said scales being on the base and the other being on one of the movable parts of said means.

In witness whereof, I have hereunto affixed my signature in the presence of the witnesses herein named.

HENRY F. DUNN.

Witnesses:
N. ALLEMONG,
C. G. HOEN.

---

Copies of this patent may be obtained for five cents each, by addressing the "Commissioner of Patents, Washington, D. C."